Patented Oct. 9, 1951

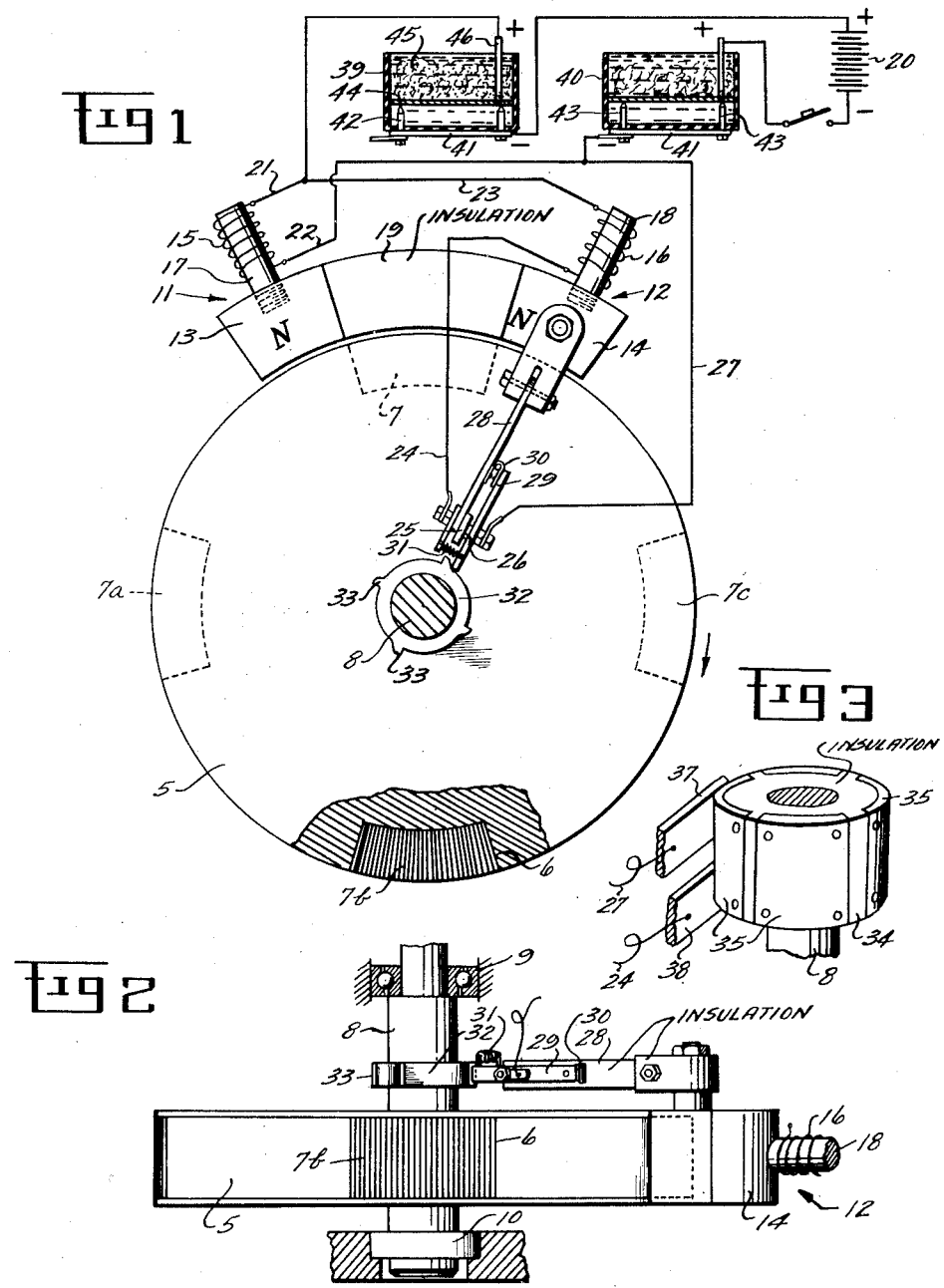

2,570,531

UNITED STATES PATENT OFFICE 2,570,531

MAGNETICALLY OPERATED MOTOR

John J. Drury, Troy, Ohio

Application November 5, 1947, Serial No. 784,237

2 Claims. (Cl. 172—36)

This invention relates to a magnetically operated motor.

One object of the invention is to provide a simple efficient motor in which the rotation of the rotor is effected by electromagnets.

A further object of the invention is to provide such a motor comprising two electromagnets so arranged and controlled that the magnetic force exerted on each rotor armature as it approaches and moves past said magnets will be modified to effect smooth continuous rotation of the rotor.

A further object of the invention is to provide such a motor comprising two electromagnets arranged in tandem and in which the magnetic force of the second magnet is decreased and the magnetic force of the first magnet is increased as each armature moves to a predetermined position with relation to said second magnet.

Other objects of the invention may appear as the motor is described in detail.

In the accompanying drawings Fig. 1 is a schematic view of a motor embodying the invention, with the rotor partly in section; Fig. 2 is a side elevation of the motor of Fig. 1; and Fig. 3 is a detail view of a modified form of circuit breaker and closer.

In these drawings I have illustrated one embodiment of the invention but it is to be understood that this embodiment is shown for the purpose of illustration and that the motor as a whole, as well as the several parts thereof, may take various forms without departing from the spirit of the invention.

The rotor preferably comprises a rotatable body of non-magnetic material, such as aluminum or brass, having mounted on the peripheral portion thereof a circumferential series of armatures of magnetic material. In the particular construction here shown the rotor comprises a cylindrical body 5 of non-magnetic material which is of a relatively short axial length, so that it constitutes a relatively thick disk. A plurality of recesses 6 are formed in the peripheral surface of the rotor, the several recesses being of the same circumferential length and being spaced one from the other equal distances. Mounted in each recess is an armature of magnetic material. In the present instance there are four recesses and four armatures which are designated as 7, 7a, 7b and 7c respectively. The armatures have their outer surfaces curved about the axis of the rotor and are of such thickness that the outer surface of each armature is substantially flush with the peripheral surface of the rotor. The armature may be of any suitable construction and in the present instance each armature comprises a series of substantially radial laminations of metal, as shown at 7b. The armatures may, if desired, be in the nature of permanent magnets but preferably they are formed of soft iron without permanent magnetism. The rotor is mounted on and rigidly secured to a shaft 8 which projects beyond the respective ends of the rotor and is supported in bearing 9 and 10.

Arranged adjacent the periphery of the rotor, on one side of the axis of the latter, are a plurality of electromagnets, there being preferably two of these magnets, 11 and 12, and the magnets being arranged in tandem circumferentially of the rotor and being spaced radially from the rotor a short distance. The magnets may be of any suitable character but as here shown each magnet comprises a body of magnetic material, 13 and 14, each body portion being provided with a magnetic coil or winding, 15 and 16. Preferably the coils are wound about substantially radial studs, 17 and 18, mounted in and projecting outwardly beyond the respective magnet bodies 13 and 14. Preferably the magnet bodies are of steel or hard iron which will retain an appreciable amount of residual magnetism, so that a part of the magnetism of each magnet is of a permanent character. The two magnets are spaced one from the other a distance which preferably approximates the circumferential lengths of the respective armatures and interposed between the two magnets is magnetic insulation 19, such as a body of non-magnetic material. The magnets may be connected with a suitable source of electric current, such as a battery 20, in any suitable manner. As here shown the coil 15 of the magnet 11 is connected in the main battery circuit comprising wires 21 and 22. The coil 16 of the magnet 12 is in a shunt circuit connected across the main circuit and this shunt circuit includes a circuit breaker and closer whereby the magnet 12 can be intermittently energized and deenergized. In the present arrangement one end of the coil 16 of magnet 12 is connected by a wire 23 with the wire 21 of the main circuit and the other end of that coil is connected by a wire 24 with the fixed contact member 25 of a circuit breaker and closer, and the movable contact member 26 of the circuit breaker and closer is connected by a wire 27 with the wire 22 of the main circuit.

The circuit breaker and closer may be of any suitable character and as shown in Fig. 1 the fixed contact 25 is carried by an insulating arm 28 which is supported on a fixed part of the structure, such as the body 14 of the magnet 12. The movable contact member 26 is carried by a shorter arm 29 which is pivotally connected at 30 with the supporting arm 28 and is also connected with the arm 28 by a spring 31 which normally retains the movable contact member 26 in engagement with the fixed contact member 25. Mounted on the rotor shaft 8 is a cam 32 having four lobes 33 arranged to successively engage the inner end of the movable arm 29 as the rotor rotates. The cam lobes are so arranged with relation to the armatures of the rotor that the shunt circuit for the magnet 12 will be opened as each armature approaches a predetermined position with relation to that magnet and will be released and closed as that armature moves beyond said predetermined position. The circuit breaker and closer may, of course, be of any suitable character and in the modification of Fig. 3 it is shown as comprising a cylindrical body 34 of insulating material rigidly mounted on the rotor shaft 8 and having embedded in the peripheral surface thereof four arcuate contact members or plates 35 which are spaced circumferentially one from the other. Contact fingers, or brushes, 37 and 38, which are connected respectively with the wires 24 and 27 of the shunt circuit, simultaneously engage each contact plate 35 and thus close the shunt circuit and open the same as the brushes pass over the insulation between adjacent contact plates.

In Fig. 1 the rotor is shown as rotating in the direction of the arrow and the armature 7 has moved past the magnet 11, which is first in the direction of rotation of the rotor, and is about to move into line with the magnet 12. It will be noted that one of the cam lobes 33 of the circuit breaker and closer is about to engage the movable arm 29 and thus open the shunt circuit and deenergize the coil of magnet 12. The interruption of the circuit through the coil of the magnet 12 causes all the current from the source of current to flow through the coil 15 of the magnet 11 and thus materially increase the magnetic force of that magnet, but the permanent magnetism of the magnet 12 will continue to exert a pull on the armature 7. At the time the shunt circuit is broken the succeeding armature, 7a, will have moved toward the magnet 11 and the increased force of that magnet will exert a powerful pull upon the armature 7a and as the armature 7a approaches alinement with the magnet 11 the armature 7 will move beyond the magnet 12 and the shunt circuit will be again closed to energize the magnet 12, so that the magnetic field of that magnet will also embrace the succeeding armature 7a and that armature will move to the position occupied by armature 7 in the drawing. Thus the several armatures move successively to and beyond the electromagnets and as the speed of rotation of the rotor builds up and additional momentum is acquired thereby the rotor will rotate at relatively high speed and will transmit substantial power to the shaft 8.

In some cases, particularly where the source of current is a battery, it may be desirable to amplify that current in order to increase the magnetic force of the magnets. This may be accomplished by interposing in the main battery circuit one or more booster cells as shown in Fig. 1. As shown at 39 and 40 each of these cells comprises a receptacle of hard rubber, or other suitable material, adapted to contain dilute sulfuric acid. Secured to the bottom of each cell exteriorly thereof is a conductor plate 41 which carries a plurality of electrodes, 42 and 43 respectively, which extend into the liquid in the cell. Figure 1 somewhat diagrammatically illustrates the construction and arrangement of the cells 39 and 40. While it is to be understood that the character of the cells 39 and 40 may be varied, each of the cells includes a positive and a negative terminal for use in connecting the cell in series circuit relationship with the main battery or source of current 20. The one cell may, for instance, contain lead cuttings 45 resting on a lead grid 44. An electrode 46 is connected to the grid 44 as shown. The cell 40 may, for example, consist of an electrode 43 of zinc and contains carbon in the upper part thereof.

While I have shown and described one embodiment of my invention, I wish it to be understood that I do not desire to be limited to the details thereof as various modifications may occur to a person skilled in the art.

Having now fully described my invention what I claim as new and desire to secure by Letters Patent is:

1. In a magnetic motor, a rotor comprising a non-magnetic rotatable body and a plurality of circumferentially spaced armatures secured to the peripheral portion of said body, each of said armatures comprising a series of laminations of soft iron each lying in a plane substantially perpendicular to the direction of travel of the armature, two electromagnets supported adjacent the path of rotation of said armatures and spaced apart circumferentially of said rotor a distance approximating the length of the individual armatures, each of said magnets including a magnetizing coil, said coils being connected in parallel with a source of current, and means controlled by the rotation of said rotor for disconnecting that one of said magnetizing coils which is second in the direction of rotation of said rotor from said source of current, and for thereafter connecting said second magnetizing coil with said source of current when said armature has moved to a predetermined position with relation to said second magnet.

2. In a magnetic motor, a rotor comprising a non-magnetic rotatable body and a plurality of armatures secured to the peripheral portion of said body, spaced one from the other, each of said armatures comprising a series of laminations of soft iron each lying in a plane substantially perpendicular to the direction of travel of the armature, two electromagnets supported adjacent the path of rotation of said armatures, spaced apart circumferentially of said rotor a distance approximating the length of the individual armatures, each of said magnets including a relatively large body part close to but spaced from said path of rotation, a second relatively small radially projecting permanent magnet core part and a magnetizing coil on said second part, magnetic insulation between said magnets, said coils being connected in parallel with a source of current, means controlled by the rotation of said rotor for de-energizing the coil of that magnet which is second in the direction of rotation of said rotor as each of said armatures closely approaches said second magnet, and for again energizing said coil of said second magnet as each said armature moves beyond said second magnet.

JOHN J. DRURY.

REFERENCES CITED

The following references are of record in the file of this patent:

UNITED STATES PATENTS

| Number | Name | Date |
| --- | --- | --- |
| 126,628 | Farmer | May 14, 1872 |
| 432,707 | Humbert | July 22, 1890 |
| 530,432 | Kuchenmeister | Dec. 4, 1894 |
| 1,531,799 | Lux | Mar. 31, 1926 |
| 1,674,383 | Willis | June 19, 1928 |
| 2,251,505 | Stephenson | Aug. 5, 1941 |